Nov. 12, 1935.  L. S. LABOWITZ ET AL  2,020,381
ASSOCIATED PACKAGE AND SOUND RECORD
Filed Jan. 7, 1933
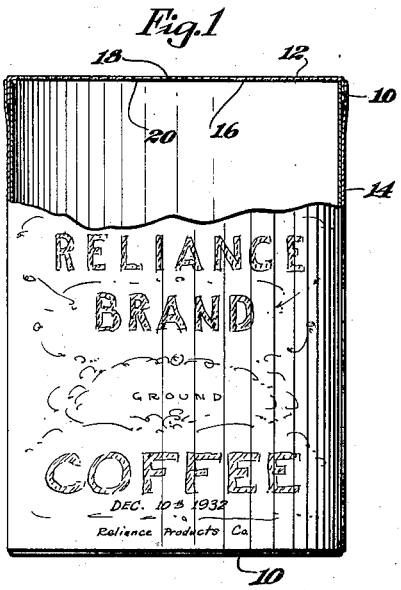
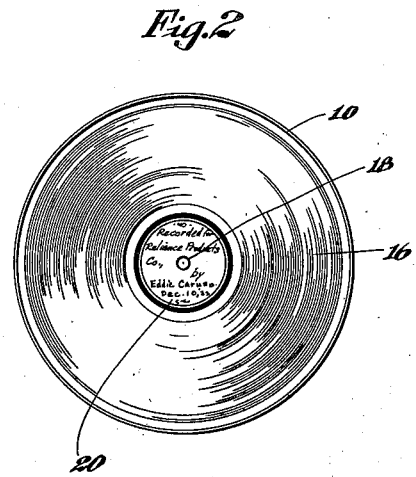
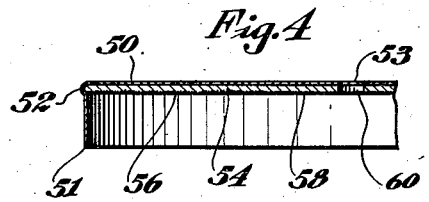
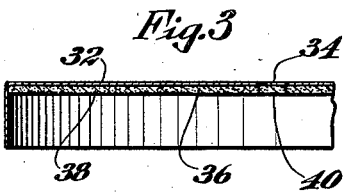
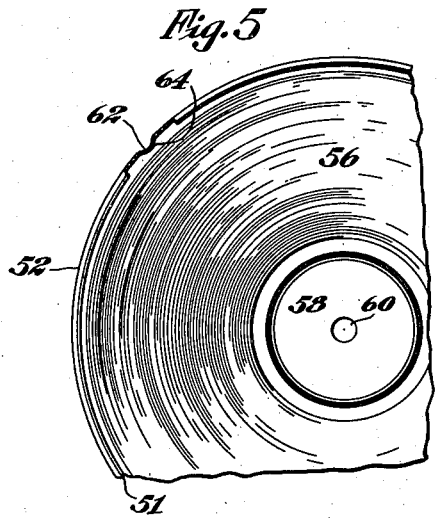
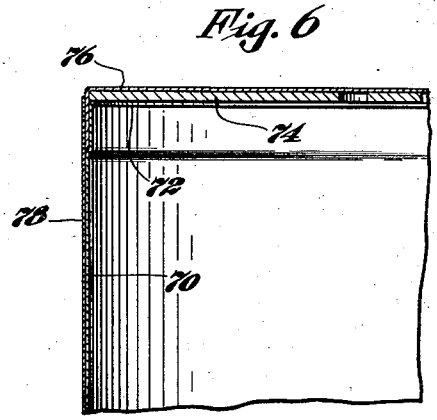
INVENTORS
Leonard S. Labowitz,
Abraham Lastfogel,
BY
ATTORNEY Patented Nov. 12, 1935

2,020,381

UNITED STATES PATENT OFFICE 2,020,381

ASSOCIATED PACKAGE AND SOUND RECORD

Leonard S. Labowitz, Cleveland, Ohio, and Abraham Lastfogel, New York, N. Y.; said Lastfogel assignor to William Morris Agency, New York, N. Y., a corporation of New York Application January 7, 1933, Serial No. 650,632

5 Claims. (Cl. 206—46)

This invention relates to the association with merchandise, of a message so recorded as to be reproducible in audible form, and more particularly to a novel arrangement permitting of the reproduction of the message by instrumentalities generally found in the home.

A great amount of the advertising today is by broadcasting over the radio, and the benefit from such advertising is generally accepted as being in proportion to the drawing power and popularity of those talking or otherwise performing over the radio, and for this reason extravagent sums of money are paid to well known artists who broadcast by this medium.

It is one of the objects of our invention to so tie up an actual performance over the radio with a recorded message as to integrate the two, and more particularly, to so associate a message recorded by the person who does the broadcasting with the performance over the radio, as to make the reproduction at home of the recorded message on an instrument such as the phonograph, in effect a continuation of the broadcast, so that the attractive value of the message will in certain respects, be as great as that of the radio broadcast, and for this purpose our invention contemplates that the broadcaster over the radio may record part or a continuation of this radio performance in the form of a phonographic record, which will be shipped with the merchandise in associated relation thereto so that this record, when reproduced on the phonograph, will in effect be a continuation of the radio advertising campaign.

As is well known, the rules of the Radio Commission and the standards of professional ethics of radio performers greatly restrict the use of laudatory matter relating particularly to the featured merchandise. For that reason, the association with the merchandise of a reproducible record in addition to serving as a continuation of a broadcasting campaign by radio, permits of a wider latitude in expression and of statements of a more personal nature than is permitted or called for in transmitting by radio, and therefore a record as a part of the radio broadcast may involve a presentation by the record which while quite different from that over the radio, will nevertheless be properly integrated therewith.

We have herein illustrated our invention as employed in connection with a food or other product which is received in a container having a removable top and as having the message so recorded as to form what is known as a phonograph record. It will be understood that our invention is not to be so limited unless called for by the language of the claims.

It is a further object of our invention to associate a phonographic record of the character herein set forth with a removable part of the container in a novel and inexpensive and readily usable manner.

It is a further object of our invention to so associate a phonograph record with a merchandise container for the purposes herein set forth that a container portion in effect becomes part of the record itself.

For the attainment of the above objects and such other objects as may hereinafter appear or be pointed out, we have illustrated our invention in the drawing wherein:

Figure 1 is an elevational view partly in cross-section of a container suitable for holding merchandise, having a phonographic record associated with same;

Figure 2 is a plan view of the inside of the cover of the container shown in Figure 1, showing the sound record applied thereto;

Figure 3 shows a modified form of cover;

Figure 4 shows a further modification of the cover and of the association therewith of a separate sound record;

Figure 5 is a plan view of the form of cover shown in Figure 4, a portion being broken away; and Figure 6 is a vertical cross-sectional view of still another embodiment of our invention.

Our invention contemplates such an association between the recorded message and a container part whereby both cooperate in a unique way for the purpose of permitting our invention to be practiced in a simple, efficient and inexpensive way, and upon referring to the drawing in detail, it will be observed that in Figure 1 is shown a cylindrical container having a body portion 10, a cover 12, and a label 14 pasted over the cover and body so as to seal the container, thereby insuring freshness of the contents. The cover 12 in this particular embodiment is made of material suitable for the formation on the inside thereof of a spiral sound record of standard and customary form and intended for reproduction on sound reproducing devices of standard form such as are ordinarily found in homes, and such record is indicated at 16. At 18 is shown a "soft spot", by which is meant readily removable portion intended to be removed from the cover for the purpose of leaving a hole such as is necessary for introduction of the sound record into standard sound reproducing apparatus. The center portion 20 of the record may have inscribed thereon the data relative to the product and the performance, such as the name of the product and the distributor and the title or subject of the performance, the name of the performing artist and the date of the performance.

In Figure 3, is shown a slightly modified embodiment wherein a cover 32 sutiable for association with a cylindrical container has permanently associated with the inside thereof, a layer of material suitable for the formation thereon of a reproducible sound record, as described above. This material, indicated at 36, may be wax or synthetic resin or any of the other suitable substances well known in the art, and will have formed therein the sound record 38. The layer 36 is provided with a removable portion 40, which, in conjunction with a hole 34 in the cover 32 registering therewith, will serve to provide a hole such as is necessary for reproducing purposes.

It will be observed in connection with the embodiments of Figures 1 and 2 that a relatively rigid portion of the container, in the instant case the cover, forms, in fact, the record itself, and is removed and associated with a phonograph for such use and it will therefore be understood that it is within the purview of our invention that any part, or in fact, a whole container may be so employed, where the character of the container permits of such use.

Another form of the invention is shown in Figures 4 and 5, and in this form a cover 50, having a rim 51, is provided with a groove 52 at the base of the rim into which may be sprung a sound record 54 having the spiral sound groove 56 and the descriptive portion 58. For the purpose of springing the record into the cover, the latter may be made of resilient or slightly resilient material. If the degree of union is such that the record cannot be removed after insertion, the record 54 and cover 50 may be used as a unit, and to enable such use we provide the record with a hole 60 which registers with a "soft spot" 53 on the cover and forms the hole necessary for reproducing the record in standard machines when the material of the soft spot is removed, and we also provide means to prevent relative rotation between the record and cover, such for instance as an inward projection 62 applied in the groove 52, which will engage a notch 64 in the rim of the record. Such a means may of course take many other forms such as uniting the cover and the record by cement, such provision being of course necessary for purposes of reproduction in standard machines, as will be obvious to those familiar with such machines.

However, the union between the record and the cover may be such that the record, by suitable manipulation of the cover may be removed therefrom prior to use. In that case the soft spot 53 is unnecessary.

In Figure 6 we show a container 70 having an inwardly turned rim 72 on which will rest a sound record 74, which is of such size that it will rest on the rim and that the cover 76 may be placed over it, and the record will be held in place between the cover 76 and the rim 74. A label 78 is shown as sealing the container by uniting the cover and the body thereof. In this case the record is at all times separate from the container.

Having thus described our invention and illustrated its use, what we claim as new and desire to secure by Letters Patent, is:

1. In combination with a container for merchandise, a reproducible sound record, means serving to hold said record in adjacency to a portion of the container, and means serving to hold said record in non-rotatable relation to a portion of the container, said means comprising interengaging parts on said record and said portion of the container.

2. A container for merchandise having a reproducible sound record laudatory of the contents of said container, permanently associated with portions thereof, said record having a portion thereof adaptable for the reception of the locating device of standard sound reproduction apparatus and portions of said container, positioned in opposed relation to said last-named portions of the record, being readily removable to adapt the portions carrying said record for insertion into a standard sound reproducing machine.

3. In a container for merchandise, a layer of material suitable for the recording of sounds permanently associated with said container and a reproducible sound record formed in said material, said container having portions thereof adapted to receive the locating device of a standard sound reproducing apparatus and portions of said material opposed to said last-mentioned portions of said container being readily removable to adapt the insertion of said sound record and its associated parts into a standard sound reproducing machine.

4. In a container for merchandise, a container member having a recessed portion thereon, and a reproducible sound record, adapted to be received and held within said recess, and positive means operative between said record and said member for positively preventing relative rotation thereof, said means comprising interengaging means on said record and on said member.

5. In a container, a sound record adapted for reproduction in standard sound reproducing apparatus provided with a centering and locating projection, permanently associated with a portion thereof, a part of said container portion, centrally located with respect to said sound record, being readily removable so that the opening formed by such removal will be adapted to receive the centering projection of the reproducing apparatus.

LEONARD S. LABOWITZ.
      ABE LASTFOGEL.